US007289309B2

(12) United States Patent
Zeller et al.

(10) Patent No.: US 7,289,309 B2
(45) Date of Patent: Oct. 30, 2007

(54) ISOLATION APPARATUS

(75) Inventors: Peter Zeller, Pichl bei Wels (AT); Walter Schmidt, Bellikon (CH)

(73) Assignee: ABB Schweiz AG, Baden (CH)

( * ) Notice: Subject to any disclaimer, the term of this patent is extended or adjusted under 35 U.S.C. 154(b) by 437 days.

(21) Appl. No.: 10/422,939

(22) Filed: Apr. 25, 2003

(65) Prior Publication Data

US 2003/0210508 A1 Nov. 13, 2003

(30) Foreign Application Priority Data

Apr. 25, 2002 (EP) .................................. 02405342

(51) Int. Cl.
*H02H 1/00* (2006.01)

(52) U.S. Cl. ...................................... 361/117; 361/120

(58) Field of Classification Search ........ 361/120-131, 361/117; 102/223; 337/6
See application file for complete search history.

(56) References Cited

U.S. PATENT DOCUMENTS

| | | | | | |
|---|---|---|---|---|---|
| 2,694,123 | A | * | 11/1954 | Smith, Jr. | 337/281 |
| 2,757,261 | A | * | 7/1956 | Lingal et al. | 218/68 |
| 3,227,642 | A | * | 1/1966 | Lemelson | 204/168 |
| 3,265,838 | A | * | 8/1966 | Ackermann | 337/169 |
| 3,268,690 | A | * | 8/1966 | Frink et al. | 337/275 |
| 3,305,656 | A | * | 2/1967 | Devins | 218/150 |
| 3,909,570 | A | * | 9/1975 | Harner et al. | 218/150 |
| 4,250,365 | A | * | 2/1981 | McConnell | 218/95 |
| 4,342,978 | A | * | 8/1982 | Meister | 337/6 |
| 4,434,336 | A | * | 2/1984 | Garzon | 218/116 |
| 4,566,401 | A | * | 1/1986 | Tomita | 116/207 |
| 4,663,692 | A | * | 5/1987 | Carothers et al. | 361/117 |
| 5,113,167 | A | * | 5/1992 | Raudabaugh | 337/30 |
| 5,434,550 | A | | 7/1995 | Putt | |
| 5,471,185 | A | * | 11/1995 | Shea et al. | 335/51 |
| 5,952,910 | A | * | 9/1999 | Krause | 337/30 |

FOREIGN PATENT DOCUMENTS

| | | |
|---|---|---|
| DE | 10030669 A1 | 1/2002 |
| DE | 10047503 A1 | 4/2002 |
| JP | 01159984 | 6/1989 |
| JP | 03165479 | 7/1991 |

* cited by examiner

*Primary Examiner*—Michael Sherry
*Assistant Examiner*—Danny Nguyen
(74) *Attorney, Agent, or Firm*—Buchanan Ingersoll & Rooney PC

(57) ABSTRACT

The apparatus is intended for disconnection of a live electrical conductor and has an enclosure (3) and two power connections (1, 2) which are passed out of the enclosure (3). A conductor section (7) which connects the two power connections (1, 2) to one another and a propellant means are arranged in the enclosure interior (4). The propellant means is used to produce an amount of compressed gas which is sufficient to disconnect the conductor section (7) when a fault current occurs. The propellant means is kept free of combustible substances and is chosen such that the amount of compressed gas which is required for disconnection can be thermally released from the propellant means by the electrical work produced by the fault current. Since explosive substances are avoided in the apparatus, the apparatus can be produced, transported, installed and maintained completely safely. After being commissioned, the apparatus is distinguished by high operational reliability.

9 Claims, 4 Drawing Sheets

ISOLATION APPARATUS

FIELD OF THE INVENTION

The invention is based on an apparatus for disconnection of a live electrical conductor as claimed in the precharacterizing clause of patent claim 1. This apparatus contains an enclosure and two power connections which are passed out of the enclosure. A conductor section which electrically conductively connects the two power connections to one another as well as a propellant means which causes the electrical conductor to be disconnected above a current-dependent limit value which can be predetermined are provided in the enclosure interior. Disconnection generally takes place as a function of the form, the magnitude and the duration of a current that is carried in the electrical conductor. Fuse wires, spring mechanisms or ignition capsules filled with explosive substances are typically used as the means for disconnection of the electrical conductor. In general, the electrical conductor produces a connection between a surge arrester and ground or high-voltage potential. The surge arrester is disconnected in a corresponding manner from the ground or high-voltage potential by the disconnection of the conductor.

BACKGROUND OF THE INVENTION

In the precharacterizing clause, the invention refers to a prior art for isolation apparatuses as is described, by way of example, in U.S. Pat. No. 5,434,550 A. One of the described isolation apparatuses is used for disconnection of a surge arrester from ground potential and has a dielectric material enclosure, out of which two power connections are passed. A cartridge filled with an explosive substance as well as two current paths that are connected in parallel between the two power connections are provided in the interior of the enclosure. One of the two current paths that has the lower impedance contains a fuse wire that is wound in the form of a coil, while one of the two current paths which in contrast has a high impedance contains a spark gap arranged between two rings. During normal operation of the surge arrester, only a very small leakage current flows through the fuse wire, which is sufficient only to heat the isolation apparatus to a permissible extent. When a brief overvoltage occurs in a network that contains the surge arrester, for example as a result of a switching operation or as a result of a lightning strike, a high current flows through the isolation apparatus for a short time. This current is commutated into the current path that contains the spark gap, with an arc being formed. If the overvoltage lasts for a relatively long time, however, owing to a faulty state in the network, then the fuse wire is melted and an arc is formed in the enclosure interior, which activates the cartridge. This results in the enclosure being detonated, and the surge arrester is disconnected from ground potential. The same effect is achieved if a faulty state of the surge arrester results in an excessively high leakage current being carried in the fuse wire. This current gradually heats the isolation apparatus to such an extent that, above a limit temperature, the cartridge is activated and the connection is disconnected as a result of the explosion. When the explosion occurs, an indicating element is made visible, and the current is commutated into a grounding conductor which contains the indicating element. However, the explosive substance in the cartridge of the isolation apparatus represents an undesirable potential hazard.

An isolation apparatus of the type mentioned initially for a surge arrester is also described in DE 100 30 669 A1. In this apparatus, a gas generator based on an airbag is arranged in a blind hole in a conductor section of a dissipation current path. When a long-lasting fault current occurs, the airbag is fired by an electrical signal which is produced in an inductive transformer through which the fault current flows. An apparatus such as this is comparatively complex.

SUMMARY OF THE INVENTION

The invention, as it is defined in the patent claims, achieves the object of specifying an isolation apparatus of the type mentioned initially, which is distinguished by a response characteristic which is adequate to achieve most protection objects and which can nevertheless be produced, transported and installed completely safely.

In the isolation apparatus according to the invention, the propellant means is kept free of combustible substances and is chosen in such a manner that the amount of compressed gas which is required for disconnection can be thermally released from the propellant means by the electrical work produced by the fault current. The electrical work produced by the current heats the propellant means, which is thermally decomposed by the supply of heat until the desired amount of compressed gas is produced in the enclosure. The compressed gas is produced by an endothermic process, which can thus be monitored well. The isolation apparatus according to the invention can therefore be produced, marketed, installed and maintained without in the process needing to comply with the precautionary measures that are required for handling combustible substances, in particular explosive substances. This not only avoids the potential hazard which is otherwise present during production, transportation, installation and maintenance, but at the same time saves costs and time which are incurred in order to reduce the safety risk and to comply with the safety regulations when using explosive substances.

In one preferred embodiment of the invention, the propellant means has an additive which develops gas as a result of vaporization and which is advantageously a liquid, in particular such as water, or possibly alternatively an alcohol. A comparatively large amount of this liquid can be absorbed very conveniently by an adsorber. For financial reasons and in order to make it possible to operate the isolation apparatus reliably and safely, it is recommended that water be provided as the liquid. The adsorber then advantageously has a capillary and/or crystal structure and can then store large amounts of water in a manner which is quite safe dielectrically. Substances which have a silicate, aluminate and/or aluminosilicate structure and which contain large amounts of water in physically bonded form in cavities, such as capillaries or intermediate layers, examples being talc (talcum), zeolite and/or moist earth (clay, sand), which have been found to be particularly useful adsorbers. In a corresponding manner, the water can be incorporated in the propellant means chemically in the form of crystal water. Particularly preferred examples of this are crystallized hydroxides, such as gibbsite.

In a further advantageous embodiment of the invention, a propellant means is used which contains a gas-forming material, which decomposes predominantly endothermically above a limit temperature. Materials which emit large amounts of gases, such as certain plastics, greases and/or oils, under the influence of arcs have been particularly proven for this purpose. These include, in particular, polymethylmethacrylates (PMMA), polyurethanes (PUR), silicones, silicone gels, silicone oils, mineral oils or organic oils or greases.

For the isolation apparatus to operate well and for a rapid response, the propellant means should expediently be arranged in the enclosure interior. If the isolation apparatus is intended to respond with a possibly relatively long delay time, then the isolation apparatus should have a spark gap which is connected in parallel with the conductor section and is arranged in the enclosure interior in order to pick up an arc, which is formed during disconnection of the electrical conductor, one of the two electrodes of the spark gap should be in the form of a hollow electrode, and the interior of the hollow electrode should then hold the propellant means. A response characteristic which can be reproduced well is achieved if, in a section on which a foot point of an arc is formed, the hollow electrode has a wall thickness which allows the gas-forming effect of the arc to act on the propellant means when the arc work is above a predetermined value.

A particularly effective arrangement of the propellant means is achieved if the conductor section, which is in the form of a coil, is integrated in the enclosure wall since, then, the available internal volume of the enclosure can be filled with the propellant means and in addition need accommodate only the parallel-connected spark gap.

BRIEF DESCRIPTION OF THE DRAWINGS

The invention will be explained in more detail in the following text using exemplary embodiments.

DETAILED DESCRIPTION OF THE INVENTION

Figure 1:
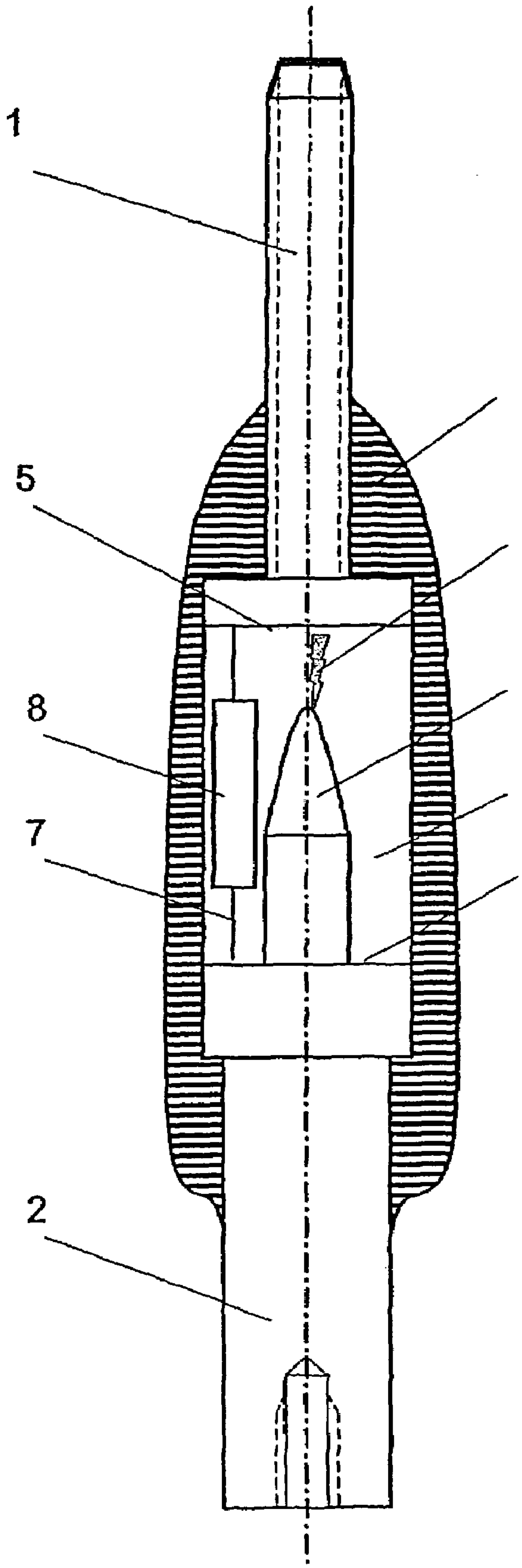
FIGS. 1 to 4 respectively show one view of one of four isolation apparatuses according to the invention, in each of which the front face of an axially symmetrical enclosure has in each case been removed in the form of an axial section.

Identical parts are identified by the same reference symbols in the figures. The isolation apparatuses which are illustrated by way of example in FIGS. 1 to 4 each have an essentially axially symmetrical arrangement of two power connections 1, 2, which are kept axially spaced apart from one another, and of an enclosure 3 which fixes the two power connections and is composed of a dielectric material such as porcelain, a thermosetting plastic or a thermoplastic polymer. The enclosure may be formed integrally, for example by encapsulation of the dielectric material, but may also be manufactured from two or more parts. The enclosure 3 has a cylindrical internal area 4, whose two end faces are formed by a respective surface 5 or 6 of in each case one of two respective power connections 1 and 2, and whose outer surface is formed by the enclosure 3.

In all the embodiments, the two power connections are electrically conductively connected to one another forming a low-impedance current path, with the aid of a conductor section 7 which is connected between the two surfaces 5, 6. In the embodiment shown in FIG. 1, this conductor section has a non-reactive resistor 8 arranged in the internal area 4, in the embodiment shown in FIG. 2 it has an inductance 9 arranged in the internal area 4, in the embodiment according to FIG. 3 it has a fusible conductor 10 arranged in the internal area, and in the embodiment shown in FIG. 4 it has an inductance 11 which is integrated in the enclosure 3 by encapsulation.

Figure 2:
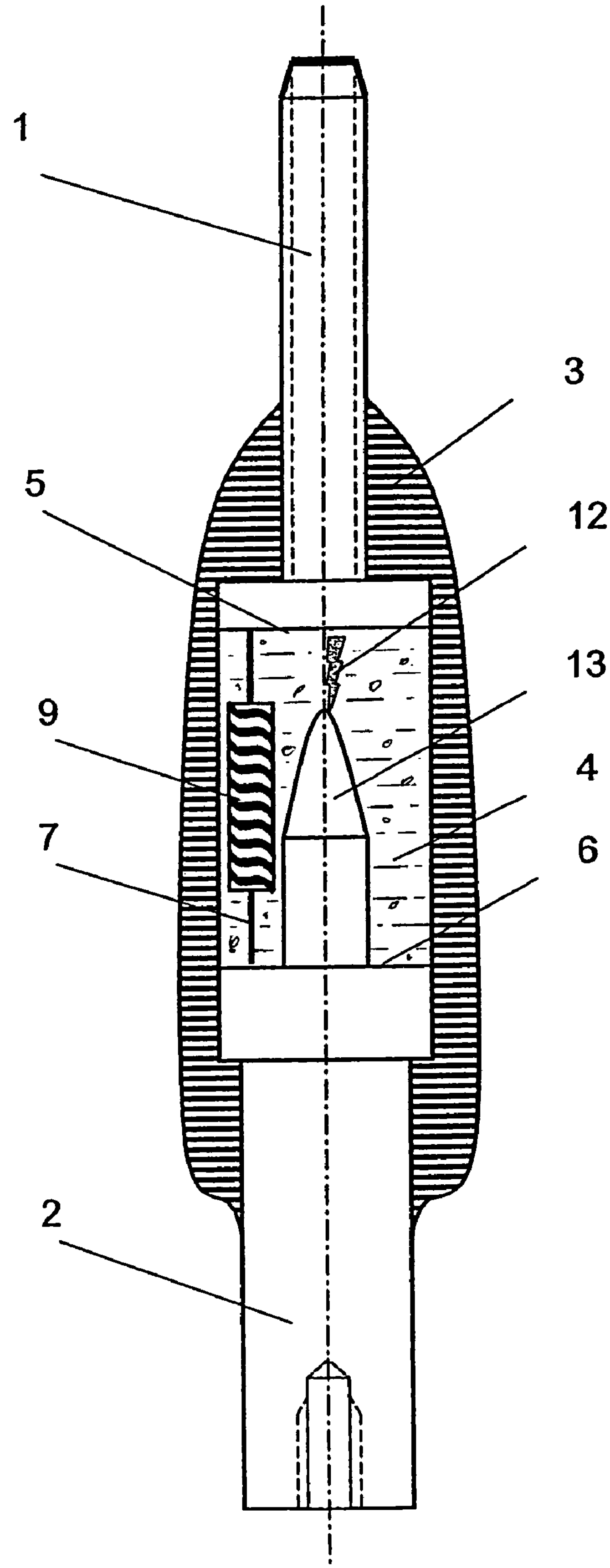
Figure 4:
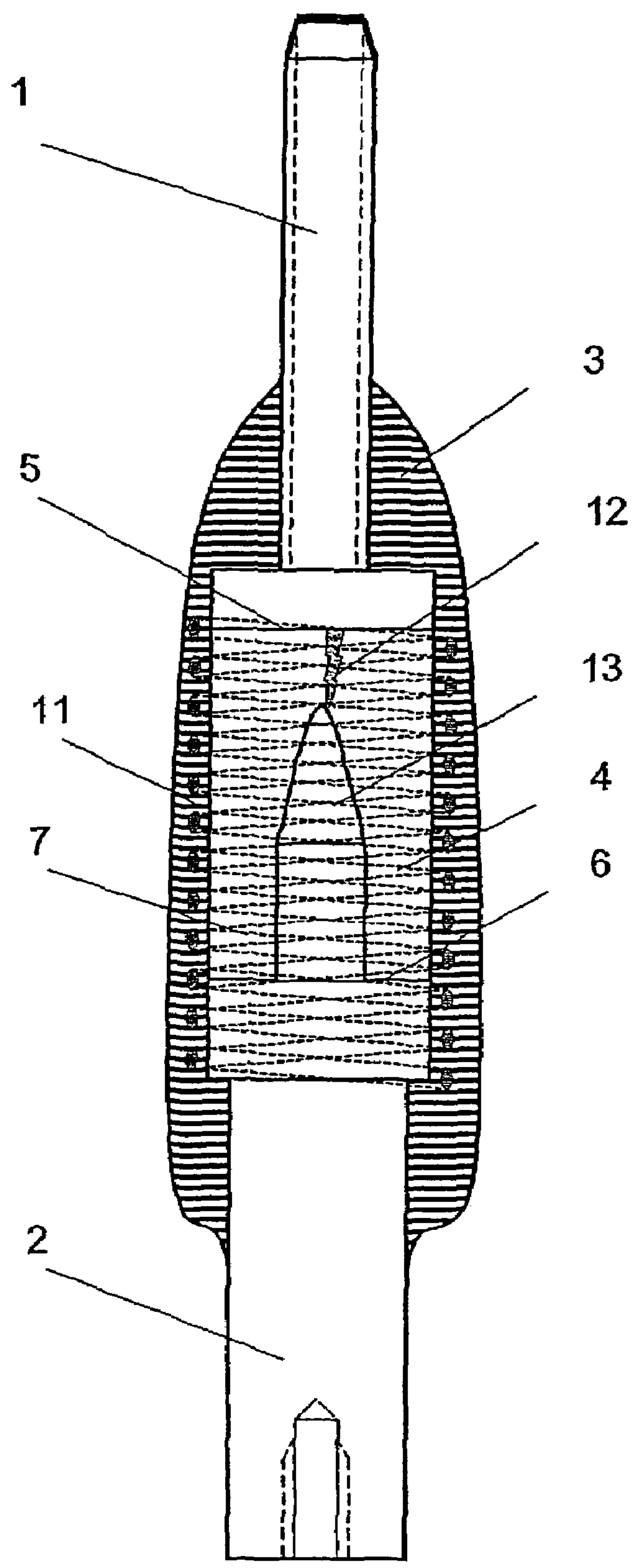

The embodiments shown in FIGS. 1, 2 and 4 at the same time also have a high-impedance current path with an axially symmetrical spark gap, which can be identified by an arc 12. One electrode of the spark gap is formed by the surface 5, and another electrode 13 is formed by a tip of a pin which is introduced into the power connection 2 on the surface 6. The high-impedance current path is connected in parallel with the low-impedance current path as represented by the conductor section 7.

In the embodiment shown in FIG. 1, a propellant means which is free of explosive substances, typically moist earth, is located in the hollow electrode 13. If a current which is flowing in the low-impedance current path through the resistor 8 and is typically supplied from a surge arrester that limits overvoltages exceeds a limit value, then the current is commutated into the spark gap, forming the arc 12. A section of the electrode 13 on which a foot point of the arc 12 is formed has a wall thickness which allows the gas-forming effect of the arc to act on the propellant means when the arc work is above a predetermined value. In the case of overvoltages which occur due to transitory processes, in particular such as switching operations or lightning strikes, in a network which contains the surge arrester, the arc work is generally not sufficient to activate the propellant means. In the event of a long-lasting fault current, the arc work on the other hand exceeds a predetermined limit value. Severe heating now results in compressed gas being formed endothermically in the propellant means, typically steam and/or oxyhydrogen. This compressed gas destroys the enclosure 3 and in the process drives the two power connections 1, 2 wide apart from one another, disconnecting the electrical conductor that is carrying the fault current. A delay which can be reproduced well in the activation of the isolation apparatus can be achieved by suitable dimensioning of the electrode and the composition of the propellant means.

Alternatively, the propellant means may fill the remaining volume of the internal area 4. The arc 12 can then be struck in the propellant means and forms compressed gas in the internal area 4 immediately after it has been struck. The formation of compressed gas is once again dependent on the arc work. By suitable dimensioning of the nature of the propellant means and the amount of the propellant means, as well as the strength of the enclosure, it is thus possible to ensure that the enclosure is not destroyed until the arc work has exceeded the predetermined limit value. Short current surges produced by transitory overvoltages can thus be carried in the isolation apparatus without destruction of the enclosure 3 while, in contrast, long-lasting fault currents lead to disconnection of the electrical conductor and to disconnection of the surge arrester from ground or from the network.

If the propellant means is enclosed in the electrode 12 or is accommodated in the internal area 4, then long-lasting fault currents of a comparatively low amplitude admittedly do not lead to the formation of arcs, but currents such as these heat the propellant means to a sufficiently great extent that, above a temperature limit value which is governed by the electrical work of the current, this propellant means supplies compressed gas at a pressure which is sufficiently high to destroy the enclosure 3.

In the embodiment shown in FIG. 2, an inductance 9 is used in the conductor section 7 instead of a non-reactive resistor 8. This makes it easier for the current to commutate from the low-impedance current path into the high-impedance current path that contains the spark gap when a brief current surge occurs which is caused by transitory overvoltages. The inductance is advantageously in the form of fusible wire. Small fault currents can thus be interrupted by melting of the wire of the inductance 9. Any arc which is formed in this process is suppressed particularly effectively by a propellant means which is provided in the internal area 4 itself and acts as a quenching means.

Figure 3:
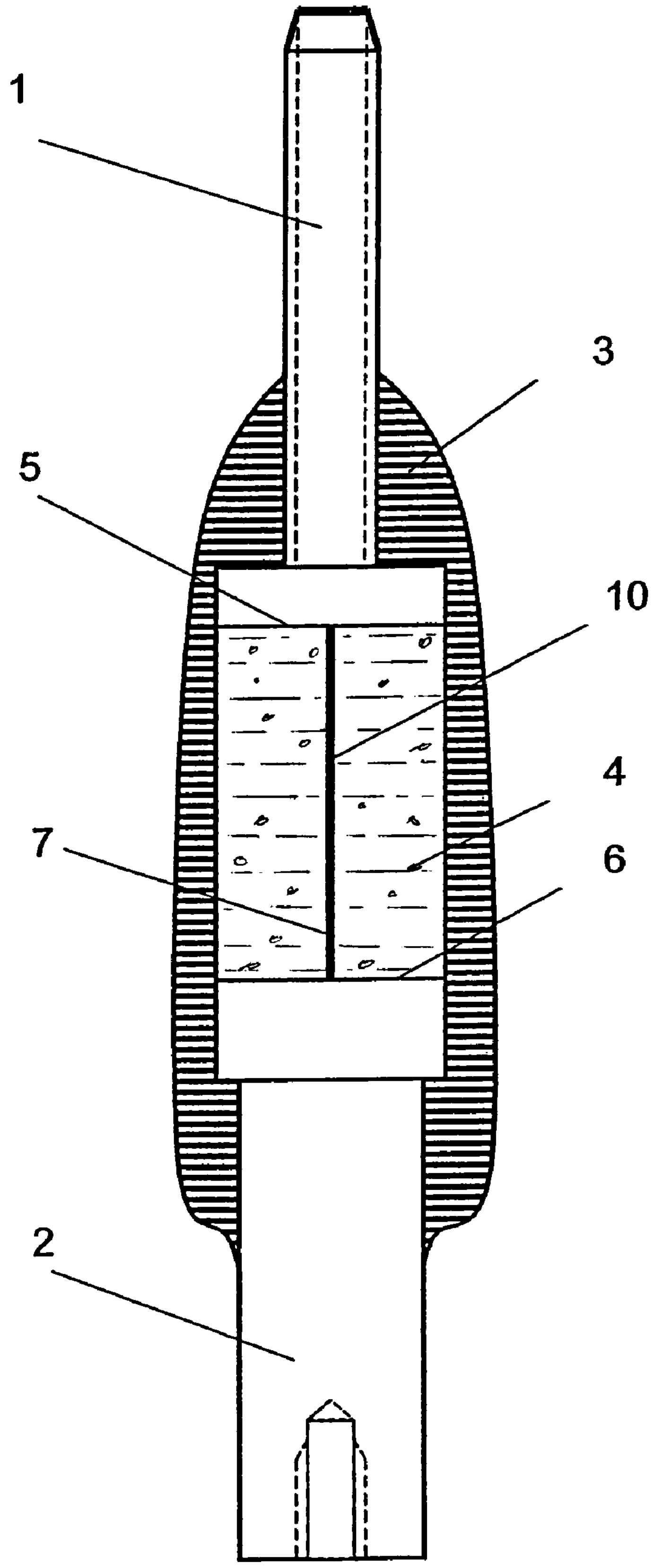

In the embodiment shown in FIG. 3, only one conductor section 7, formed by an axially routed fusible conductor 10, is provided for the low-impedance current path. There is no higher-impedance current path containing a spark gap. This embodiment is distinguished by particularly simple construction. The propellant means may fill the entire internal area 4, or only part of it. By way of example, it may be applied as a sheath to the fusible conductor 10. Suitable dimensioning of the propellant means also makes it possible with this isolation apparatus to ensure that the enclosure 3 is not blown open unless any arc that is formed after the wire 10 has melted through produces a sufficiently large amount of work.

In the embodiment shown in FIG. 4, and in contrast to the embodiment shown in FIG. 2, the low-impedance current path (which is in the form of the inductance 11) is incorporated in the wall of the enclosure 3. The inductance is then protected against the influence of the arc 12. At the same time, a particularly large amount of propellant means can be accommodated in the internal area 4, and this may be particularly advantageous for certain applications of the isolation apparatus.

LIST OF REFERENCE SYMBOLS

| | |
|---|---|
| 1, 2 | Power connections |
| 3 | Enclosure |
| 4 | Interior |
| 5, 6 | Surfaces |
| 7 | Conductor section |
| 8 | Resistor |
| 9, 11 | Inductances |
| 10 | Fusible conductor |
| 12 | Arc |
| 13 | Electrode |

The invention claimed is:

1. An apparatus for disconnection of a live electrical conductor having an enclosure;

two power connections which are passed out of the enclosure; and a low-impedance conductor section which electrically conductively connects the two power connections to one another in an enclosure interior, and a propellant means, which are arranged in the enclosure interior for producing an amount of compressed gas which is sufficient to disconnect the conductor section when a fault current occurs, wherein there is provided a spark gap which is connected in parallel with the low-impedance conductor section in the enclosure interior, and into which a current exceeding a limit value is branched from the low-impedance current section, and wherein the propellant means is kept free of combustible substances and is chosen in such a manner that the amount of compressed gas which is required for disconnection can be thermally released from the propellant means by the electrical work produced by a fault current occurring between the two power connections, and comprises at least one of an additive which can develop the compressed gas as a result of vaporization, and a material which can form the compressed gas as a result of chemical decomposition, wherein the spark gap comprises a hollow electrode having a section for receiving a root of an arc, which section has a wall thickness that allows the arc to act on the propellant means when the arc work is above a predetermined value.

2. The apparatus as claimed in claim 1, wherein the additive is a liquid.

3. The apparatus as claimed in claim 2, wherein the propellant means has an adsorber which absorbs the liquid.

4. The apparatus as claimed in claim 3, wherein water is provided as the liquid, and in that the adsorber has a capillary and/or crystal structure.

5. The apparatus as claimed in claim 4, wherein the adsorber has a silicate, aluminate and/or aluminosilicate structure.

6. The apparatus as claimed in claim 5, wherein the adsorber contains talc, zeolite, clay and/or sand.

7. The apparatus as claimed in claim 1, wherein said material which can form the compressed gas as a result of chemical decomposition contains at least one of a plastic, PMMA, PUR, silicone, silicone gel, silicone oil, mineral oil, an organic oil and grease.

8. The apparatus as claimed in claim 1, wherein the conductor section is in the form of a coil, and is integrated in the wall of the enclosure.

9. The apparatus as claimed in claim 2, wherein the liquid is water or alcohol.

* * * * *